(12) United States Patent
Cunningham

(10) Patent No.: US 6,250,591 B1
(45) Date of Patent: Jun. 26, 2001

(54) CONDUIT SUPPORT ASSEMBLY

(76) Inventor: Michael E. Cunningham, 4218 Rose Gate, Spring, TX (US) 77373

( * ) Notice: Subject to any disclaimer, the term of this patent is extended or adjusted under 35 U.S.C. 154(b) by 0 days.

(21) Appl. No.: 09/300,935

(22) Filed: Apr. 27, 1999

(51) Int. Cl.$^7$ .................................. F16L 3/08; F16L 3/12
(52) U.S. Cl. ............................................ 248/65; 248/74.1
(58) Field of Search .................... 248/49, 65, 53, 248/62, 63, 73, 74.1

(56) References Cited

U.S. PATENT DOCUMENTS

| | | | |
|---|---|---|---|
| D. 374,594 | * 10/1996 | Munoz | D7/708 |
| 2,937,833 | * 5/1960 | Sachs | 248/49 |
| 4,502,653 | 3/1985 | Curtis, Jr. | 248/55 |
| 4,513,934 | 4/1985 | Pruyne | 248/49 |
| 4,618,114 | * 10/1986 | McFarland | 248/65 |
| 4,783,029 | * 11/1988 | Geppert et al. | 248/74.1 |
| 4,899,963 | * 2/1990 | Murphy | 248/65 |
| 5,205,520 | * 4/1993 | Walker | 248/74.1 |
| 5,794,897 | * 8/1998 | Jobin et al. | 248/74.1 |
| 5,992,802 | * 11/1999 | Campbell | 248/74.1 |

OTHER PUBLICATIONS

MIRO Industries, Roof Pipestands; The Problem—Introducing the Main Contenders in the Battle to Safe Roofs, Murray, Utah 1998.

* cited by examiner

Primary Examiner—Ramon O. Ramirez
Assistant Examiner—Jerome DeLuca
(74) Attorney, Agent, or Firm—Harrison & Egbert

(57) ABSTRACT

A conduit support assembly comprising the combination of a base member and a bridge member for positioning and securing a plurality of conduits upon a rooftop surface. The support assembly base member is configured to be fixedly attached to a substantially flat rooftop surface. The bridge member is longitudinally disposed above this base member and has a pair of vertical brace members—one at each end of the bridge member. Each of the pair of brace members is affixed to the base member with a pair of legs. Disposed between the pair of brace members is a transversal member disposed parallel to and above the base member. The bridge member is configured to receive conduits disposed longitudinally atop the transversal member and also a plurality of conduits disposed in a space medial of the base member and the transversal member. Each of these various conduits is secured to the conduit support assembly with a suitable damp.

18 Claims, 5 Drawing Sheets

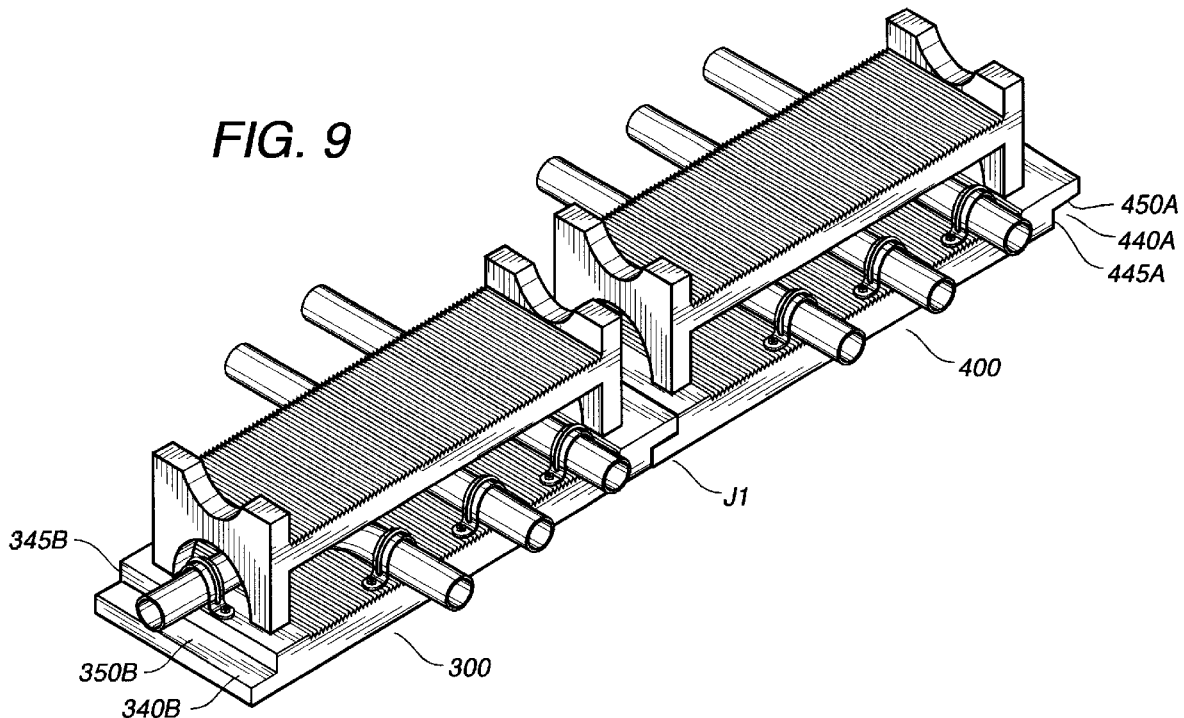
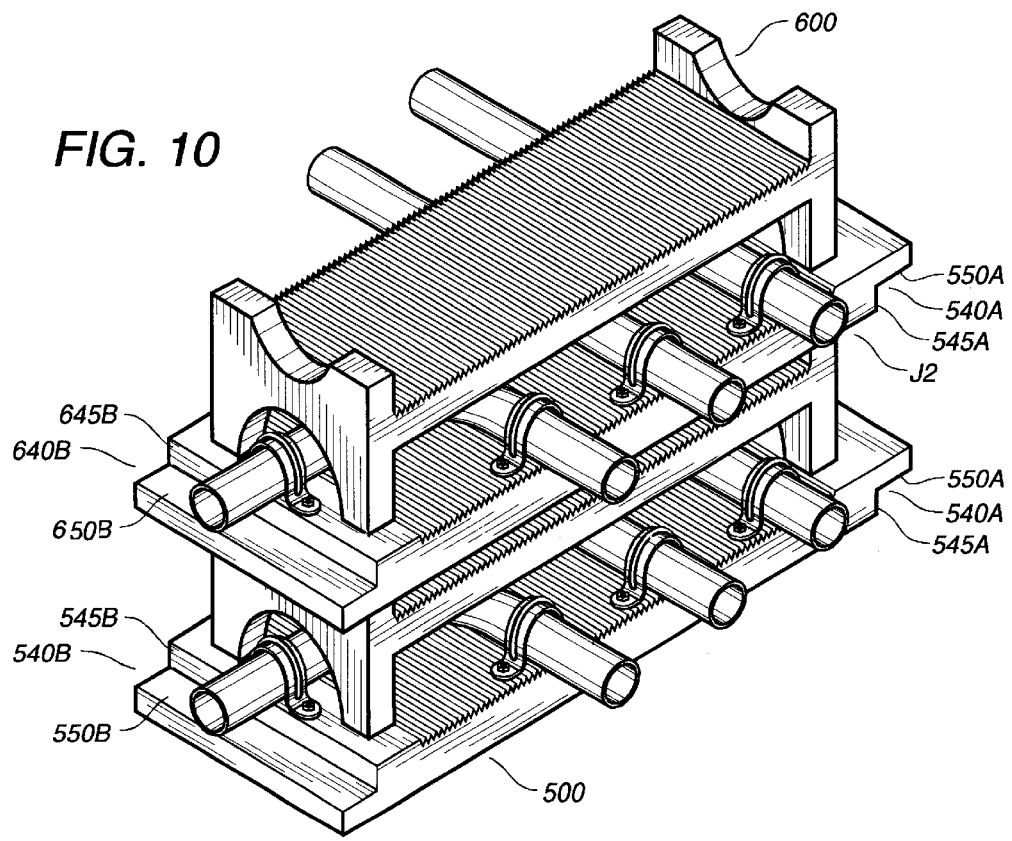

CONDUIT SUPPORT ASSEMBLY

BACKGROUND OF THE INVENTION

The present invention relates to conduit roof supports, and more particularly relates to the use of supports for positioning pipes and the like on roof surfaces and securing the pipes and the like thereto.

It is well known in the art that supports are prerequisite for positioning and securing a plurality of conduits such as pipe, electrical cable, and gas lines to roofs atop buildings. In particular, an established procedure has been to use wooden blocks cut from treated or redwood 4×4-sized lumber as a means for separating implaced conduit from the roof surface. It will be appreciated by those skilled in the art that a limitation of the use of such wooden blocks is that the roof surface must be flat in order to properly seat and secure the blocks thereto. Obviously, if a block is not securely attached to a roof surface, then any conduit, in turn, attached to the block will be susceptible to untimely separation therefrom due to unbalanced load, wind and other weather affects, and deterioration of the wood.

It has been observed that wooden blocks situated atop roofs have a life cycle of about three to five years because of external conduit stresses imposed thereupon and deterioration attributable to invasion of nails and the like into the block, and, of course, weather conditions and the like. Unfortunately, as these blocks deteriorate with time—typically undiscovered to building inhabitants and owners—damage to the roof surface occurs, thereby causing costly and even hazardous leaks and roof repair to occur. Naturally-occurring expansion and contraction of pipes and other conduit seated in such blocks eventually cause tears in the roof surface, undermining its integrity and, in turn, causing leaks and damage. Resulting repairs are a necessity, the extent of which are generally related to the timeliness of discovery of the leaks and damage. It will be readily appreciated that the timely maintenance of this conduit support system is critical to both the integrity of the underlying roof surface and the integrity of the conduits affixed thereon.

There have been attempts in the art to improve the means and method for positioning and securing conduit—particularly pipe—to roof surfaces of commercial buildings and the like. For example, Pruyne, in U.S. Pat. No. 4,513,934, discloses a pipe supporting structure that is secured to a substantially flat roof surface and having a V-shaped pocket-like recess affixed thereon for receiving and securing pipe thereto. Pipe is supported within this recess by its tapered, upwardly divergent walls that accommodate pipe sliding movement attributable to expansion and contraction. This support is designed to uniformly distribute pipe weight regardless of the flatness of the roof surface Another development in the art is described by Curtis in U.S. Pat. No. 4,502,653. Similar to the Pruyne disclosure, this patent teaches a pipe supporting structure that is configured with a V-shaped pocket-like recess that includes a roller contained in a trough for minimizing resistance to pipe sliding movement attributable to expansion and contraction. Commercial embodiments of these V-shaped pipe supports are marketed by Miro Industries as "Pillow Block" pipestands. Consistent with these two underlying patents, the Miro pipestands have been constructed with a curved base to prevent roof-surface gouging and ripping, and to absorb shock and to accommodate pipe thermal expansion and contraction, and thereby reducing erosion of the roof-surface because of frictional forces. Unlike its predecessor art, these commercial pipestands are apparently are recommended to be installed in a free-standing posture wherein no physical attachment to the roof surface beneath has been established. Rigid deck plates may be used in conjunction with the pipestands to artificially create a flat rooftop surface.

Notwithstanding these developments in the art, there appears to be no apparatus for positioning conduit atop a roof—in both horizontal and vertical dispositions—that enables cascading or stacking of conduits in a parallel arrangement, or cascading of conduits in an end-to-end arrangement. Accordingly, these limitations and disadvantages of the prior art are overcome with the present invention, and improved means and techniques are provided that are usefull for position and securing conduits to roof-surfaces while simultaneously assuring that roof-surface longevity is sustained by accommodating natural conduit thermal movements and preventing damage to the roof-surface.

SUMMARY OF THE INVENTION

The preferred embodiment of the present invention provides a conduit support assembly comprising the combination of a base member and a bridge member for positioning and securing a plurality of conduit means upon a rooftop surface. As will be hereinafter described in detail, the support assembly base member is configured to be fixedly attached to a substantially flat rooftop surface. The bridge member is longitudinally disposed above this base member and has a pair of vertical brace members—one at each end of the bridge member. Each of the pair of brace members is affixed to the base member with a pair of leg means. Disposed between the pair of brace members is a transversal member disposed parallel to and above the base member. As will be appreciated by those skilled in the art, the bridge member configured to receive conduit means disposed longitudinally atop the transversal member and also a plurality of conduit means disposed in a space medial of the base member and the transversal member. Each of these various conduit means is secured to the conduit support assembly with a suitable clamp means.

It is accordingly an object of the present invention to provide a conduit support assembly that avoids the routine 3–5 year maintenance and replacement typically associated with rooftop conduit supports.

It is an object of the present invention to provide a conduit support assembly that has the capability to support a plurality of conduits.

It is another object of the present invention to provide a conduit support assembly that may be joined in a longitudinal arrangement on rooftops to support a plurality of conduits.

It is still another object of the present invention to provide a conduit support assembly that may be joined in a stacking arrangement on rooftops to support a plurality of conduits.

These and other objects and features of the present invention will become apparent from the following detailed description, wherein reference is made to illustrative examples and to the figures in the accompanying drawings.

IN THE DRAWINGS

FIG. 9 depicts a frontal perspective view of an end-to-end arrangement joining a plurality of preferred embodiments of the present invention.

FIG. 10 depicts a frontal perspective view of a stacked arrangement joining a plurality of preferred embodiments of the present invention.

DETAILED DESCRIPTION

Figure 1:
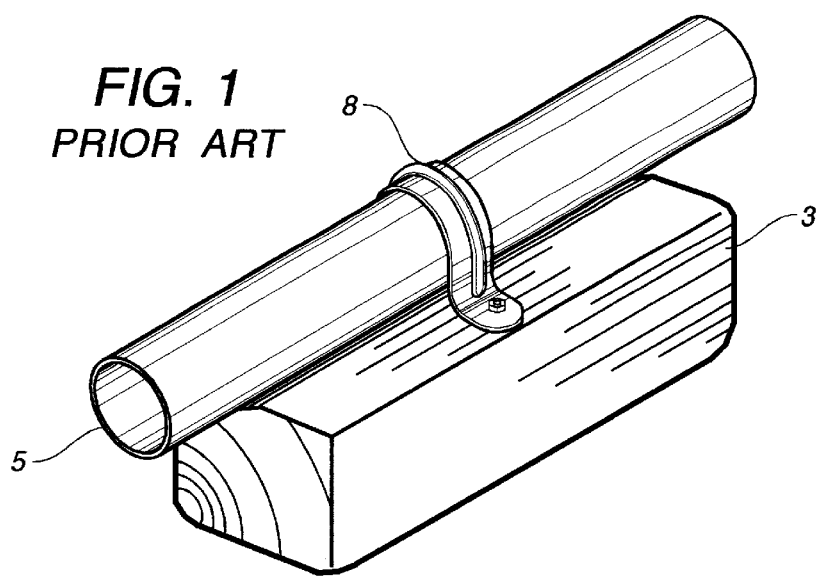
FIG. 1 depicts a frontal perspective view of the prior art.

Referring to FIG. 1, there is depicted pipe 5 damped to wooden block 3 with damp 8 as is common in the prior art. It is well known to those skilled in the art that such a pedestrian means and method is widely used for securing pipes to rooftops.

Figure 2:
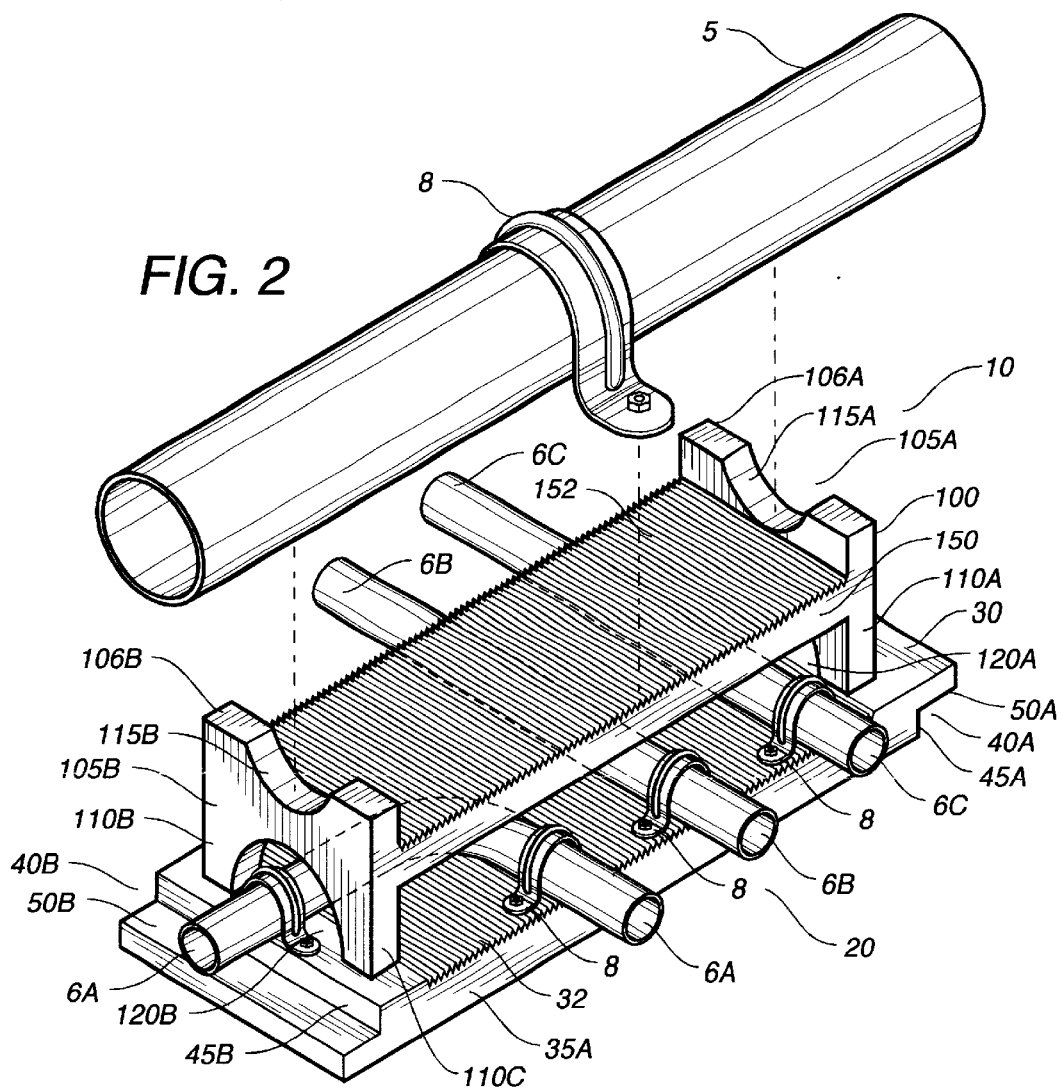
FIG. 2 depicts a frontal perspective view of the preferred embodiment of the present invention

Referring now to FIGS. 2–6 collectively, there is depicted conduit support assembly 2 corresponding to the preferred embodiment of the present invention. Referring specifically to FIG. 2, there is depicted conduit support assembly 2 comprising bridge assembly 100 disposed atop base member 20 and fixedly attached thereto as will be hereinafter described. Bridge assembly 100 comprises pair of brace members 105 A, B which are fixedly attached to transversal member 150 which is suspended, horizontally between first brace member 105 A and second brace member 105 B. As clearly shown, transversal member 150 is disposed substantially parallel to base member 20, while brace members 105 A, B are disposed perpendicular to base member 20. Brace member 105 A is affixed to base member 20 by bridge legs 110 A, B; and brace member 105 B is affixed to base member 20 by bridge legs 110 C, D.

It will be evident to those skilled in the art that the conduit support assembly taught by the present invention is configured to affix a plurality of variously-sized conduit to rooftops and the like. Thus, bridge assembly brace members 105 A, B are configured with bottom conduit receptacles 120 A, B and top conduit receptacles 115 A, B so that conduits may be accommodated as contemplated by the present invention. In particular, bottom or lower conduit receptacle 120 B is configured to receive conduit 6 A; top or upper conduit receptacle 115 B is configured to receive conduit 5. As illustrated in FIG. 2, conduit 5 is received by corresponding arcuate members 115 A, B and secured to top surface of transversal member 150 with suitable damps 8. Arcuate member 115 A is disposed medially of top edges 106 A of brace member 105 A; similarly, arcuate member 115 B is disposed medially of top edges 106 B of brace member 105 B.

Figure 3:
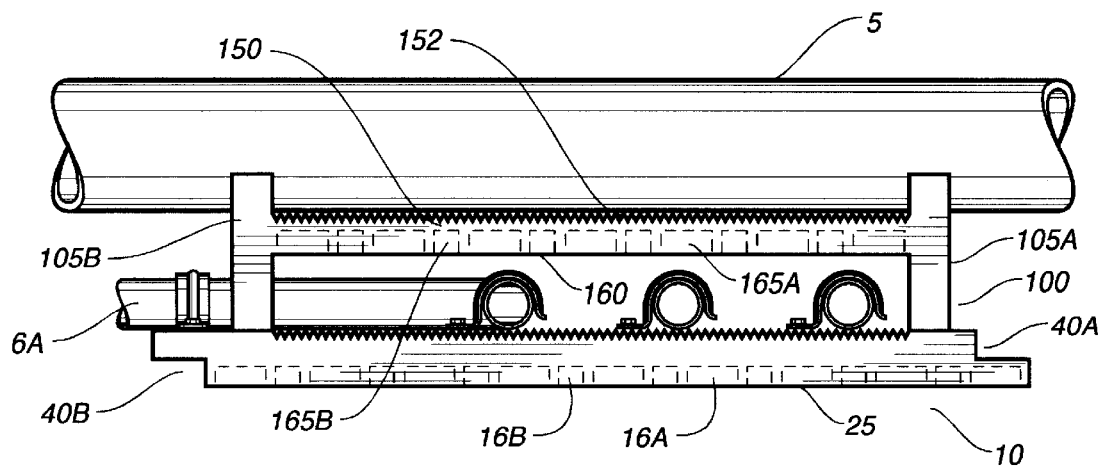
FIG. 3 depicts a front view of the embodiment depicted in FIG. 2.
Figure 6:
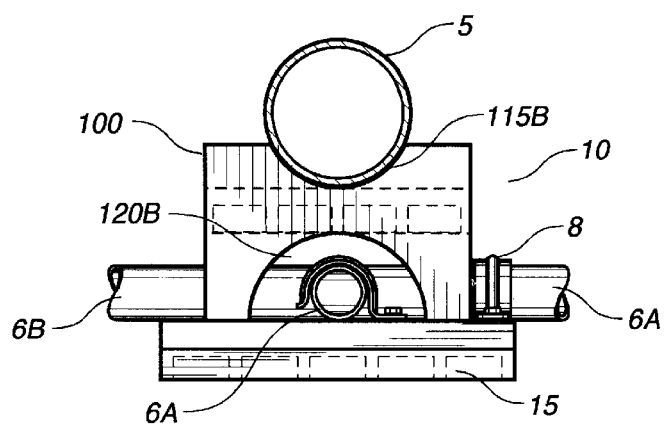
FIG. 6 depicts a left end view of the embodiment depicted in FIG. 2.

Referring now to FIGS. 2, 3, and 6, the manner and means for securing a plurality of conduits to a rooftop and the like, as contemplated by the present invention, is clearly shown. In addition to a generally large conduit securably received atop bridge assembly 100 as hereinbefore described, conduit support assembly 10 is configured to received a plurality of generally smaller conduits atop base member 20. Each of conduits 6 B and C are shown being disposed transversely of a longitudinal axis from first edge 40 A to a second, opposite edge 40 B of base member 20. It will be appreciated that conduits 6 B, C are received in the gap disposed medially of transversal member 150 and base member 20, and secured to top surface of base member 20 with suitable damps 8. As also shown particularly in FIG. 2, conduit 6 A, sized similarly to conduits 6 A, B, is received transversely upon top surface of base member 20 and, since conduit 6 A is configured with a substantially 90° bend, is also received by conduit receptacle 120. Thus, conduit 6 A—having an elbow configuration—is secured to base member 20 with suitable clamps 8, and passes through convex bridge assembly receptacle 120 B to accommodate the bend in the conduit.

Figure 4:
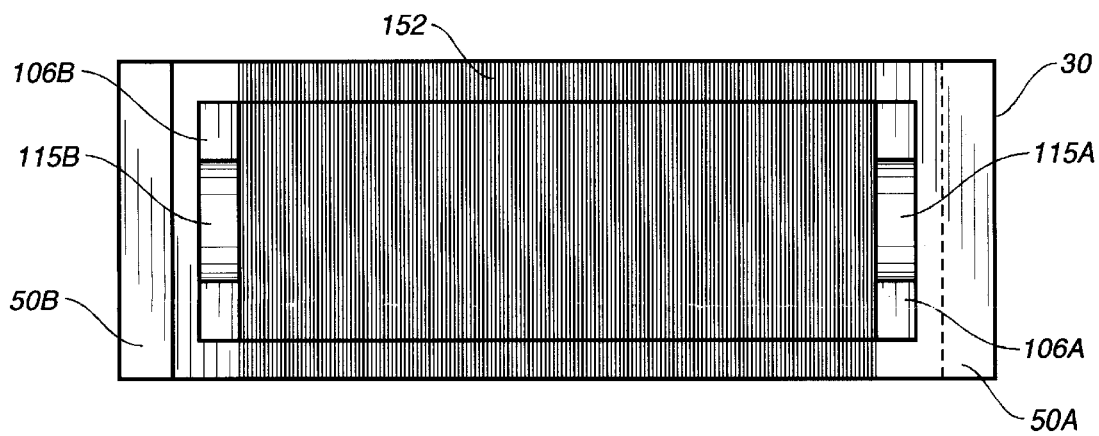
FIG. 4 depicts a top view of the embodiment depicted in FIG. 2.

Now referring specifically to FIGS. 2–4, there is shown the ribbed or corrugated covering incorporated into the preferred embodiment to promote the security of the plurality of conduits attached thereto. Ribbed or corrugated covering 32 is fixedly attached atop base member 20 to assure that conduits may be firmly secured thereto. Similarly, ribbed or corrugated covering 152 is fixedly attached atop transversal member 150 to assure that conduits may be firmly secured thereto. It will be appreciated that while conduit 5 is depicted as being longitudinally secured to bridge member 100 as hereinbefore described, a plurality of typically somewhat smaller conduits may be transversely secured thereto, similar to the means of securing a plurality of conduits to base member 20. By providing an unsmooth surface, conduit security tends to be sustained, even under circumstances in which damps have become loose due to exigent weather or environmental conditions or perhaps by being, inadvertently struck or jarred by a worker. Thus, it will be appreciated that the present invention inherently provides two parallel platforms for securing conduits thereto.

Figure 5:
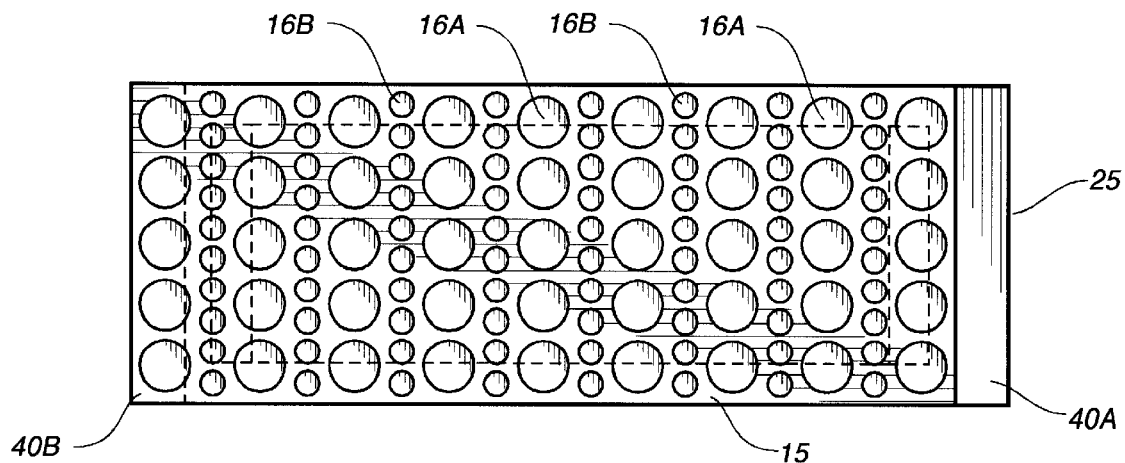
FIG. 5 depicts a bottom view of the embodiment depicted in FIG. 2.

Referring now specifically to FIGS. 2 and 5, there is depicted the undersurface of base member 20 of the preferred embodiment of the present invention. Undersurface 25 preferably is constructed with plurality of substantially hemispherical cavities or dimples 15 for imparting strength to conduit support assembly 10. It has been found that maximal strength may be attained by constructing undersurface 25 with plurality of substantially hemispherical cavities or dimples 15 comprising first plurality of substantially hemispherical cavities or dimples 16 A and second plurality of substantially hemispherical cavities or dimples 16 B, with first plurality 16 A being substantially larger in diameter than second plurality 16 B. Thus, it is preferable to construct the bottom surface of the conduit support assembly of the present invention with a matrix of dimples and the like.

It will be understood that the present invention may be constructed from such materials as hardened plastic such as ABS, galvanized steel, and non-ferrous cast aluminum, depending upon the particular requirements dictated by the location and by the nature of the conduits being affixed to rooftops. Of course, it will be appreciated by those skilled in the art that other materials may be suitable according to the needs of the application. As an example, it is contemplated that embodiments of the present invention constructed from ABS will support up to 250 pounds per square foot. It will be evident that this weight limit is increased if the material of construction is galvanized steel or cast aluminum.

Figure 7:
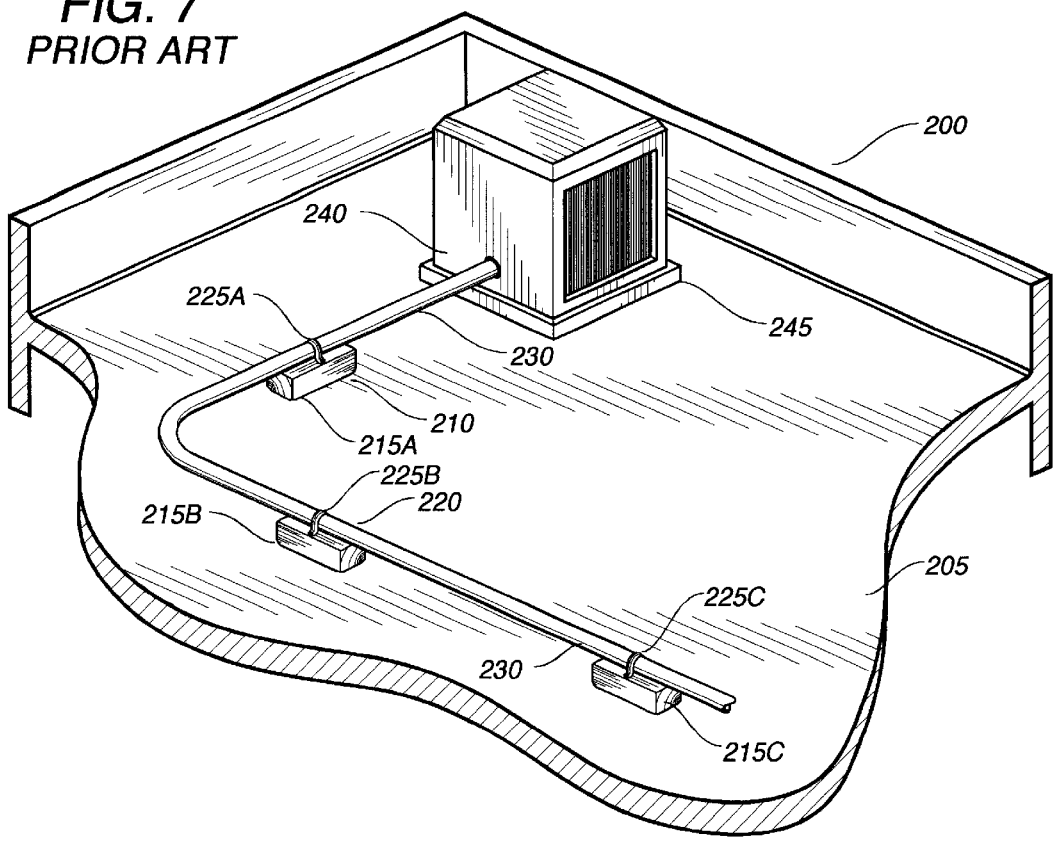
FIG. 7 depicts an illustration of how the prior art affixes conduits to rooftops.
Figure 8:
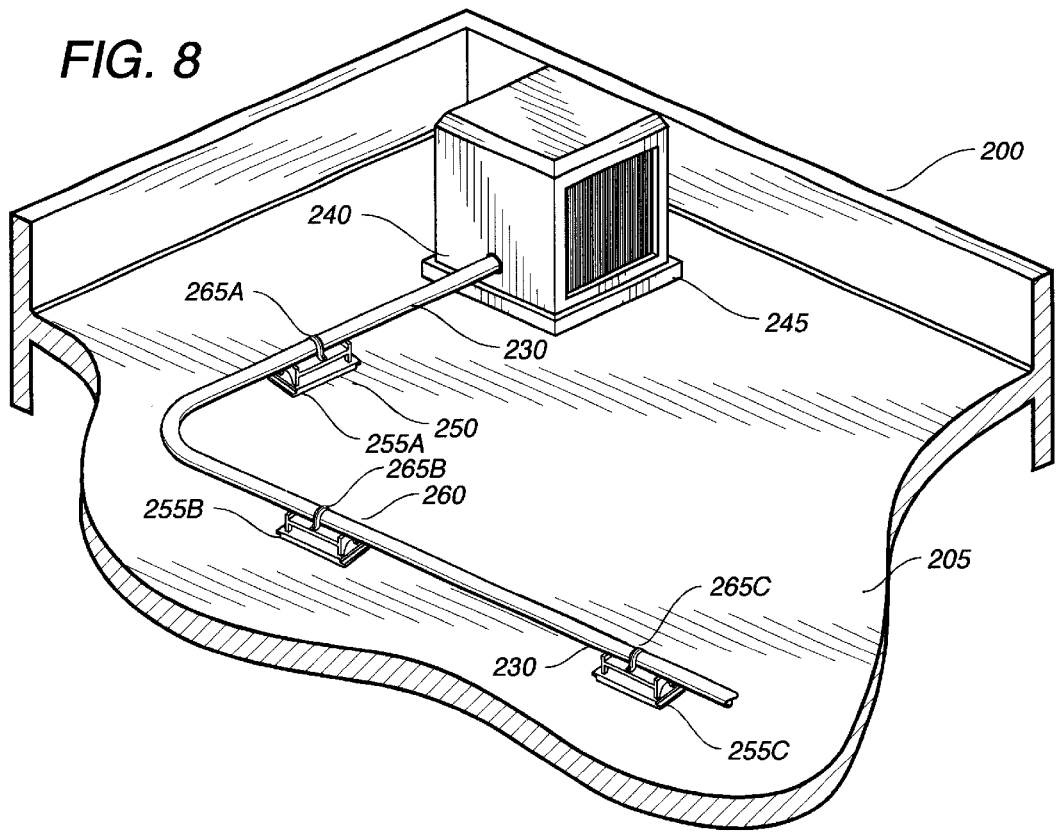
FIG. 8 depicts an illustration of how the preferred embodiment of the present invention affixes conduits to rooftops.

According to the present invention, a diversity of conduits for carrying water, electricity, and the like, may be conveniently and securably affixed to rooftops in a manner hereinbefore unknown in the art. FIGS. 7 and 8 illustrate this innovation in the art by depicting the difference between affixing air conditioning conduit to a roof via the prior art and via the present invention. Thus, as shown in FIG. 7, prior art practitioners typically use plurality of 4-by-4 blocks 210 from treated wood or Redwood to affix conduit 230 connected to air conditioner unit 240 disposed upon roof-pad 245, which is, in turn, disposed upon roof 200. Each of blocks 215 A, B, C constituting plurality of blocks 210 is secured to conduit 230 with corresponding clamps 225 A, B, C. One and only one conduit may be secured to each of blocks 215 A, B, C.

On the other hand, as shown in FIG. 8, practitioners using the present invention affix conduit 230 to plurality of conduit support assemblies atop roof 200 by securing conduit 230 to each of conduit support 265 A, B, C with corresponding damps 225 A, B, C. As hereinbefore described in detail, a plurality of conduits may be secured to each of conduit support assembly 265 A, B, C. Dimpled bottom surface 255 A, B, C of each of conduit support assembly 265 A, B, C promotes strength and security of the rooftop conduit support procedure taught by the present invention.

Referring now to FIGS. 9 and 10, another aspect of the present invention is shown. In particular, FIG. 9 depicts how a plurality of the conduit support assemblies of the present invention may be joined in an end-to-end arrangement to entertain needs that may arise in the field. Similarly, FIG. 10 depicts how a plurality of the conduit support assemblies of the present invention may be joined in a vertical, stacking arrangement to entertain needs that may arise in the field. As specifically shown in FIGS. 2 and 3, the conduit support assembly of the present invention is preferably configured with pair of coupler members or mating steps 40 A, B for joining two conduit support assemblies in an end-to-end arrangement as shown in FIG. 9. As clearly shown in FIG. 1, each coupler member 40 A, B comprises vertical edge member 45 A, B and horizontal edge member 50 A, B wherein a lengthwise joinder may be conveniently and securably achieved. It will be understood that these coupler members are designed to be complimentary so that one assembly may be longitudinally joined to another. Hence, as depicted in FIGS. 2 and 3, coupler member 40 A is configured with a upper horizontal edge means 50 A while coupler member 40 B is configured with a lower horizontal edge means 50 B.

The lengthwise joinder in FIG. 9 illustrates the benefit achieved via the complimentary relationship contemplated by the present invention. First conduit support assembly 300 and second conduit support assembly 400 are joined at joinder J1. Conduit support assembly 300 is shown with first coupler member 350 B disposed at one end: lower horizontal edge member 340 B and vertical edge member 345 B. The complimentary second coupler member 350 A disposed at the other, opposite end upper, comprising horizontal edge member 340 A and vertical edge member 345 A, is obscured by joinder J1. Conduit support assembly 400 is shown with second coupler member 450 A disposed at one end: upper horizontal edge member 450 A and vertical edge member 445 A. The complimentary second coupler member 450 B disposed at the other, opposite end upper, comprising horizontal edge member 450 B and vertical edge member 450 B, is obscured by joinder J1. It will be understood by those skilled in the art, that the end-to-end joinder contemplated by the present invention is routinely achieved by coupling an end of one conduit support having a coupler member with an upper horizontal edge member with a corresponding end of another conduit support having a coupler member with a lower horizontal edge member. Of course, once this end-to-end complimentary coupling relationship is achieved, the joinder should be secured by using fastening means known in the art. For example, screws, nails, brackets, nut-and-bolt, etc. may be used to secured this joinder.

FIG. 10 depicts the convenient manner in which a plurality of conduit support assemblies may be arranged in a stacking relationship. To stack second conduit support assembly 600 atop first conduit support assembly 500, the substantially top portion of bridge assembly brace members is simply used as a flat foundation for mounting another conduit support assembly thereon. It should be evident to those skilled in the art, that stability considerations will limit the number of conduit support assemblies that are joined by stacking. Similarly, even if the conduit support assembly taught by the present invention is not attached to a horizontal portion of the roof, i.e., attached to a vertical portion of the roof or otherwise, stability considerations will still limit the number of conduit support assemblies that may be joined by stacking. Of course, once this stacking relationship is achieved, the joinder should be secured by using fastening means known in the art.

It should be dearly understood that the arrangement of conduits that may be accommodated by the present invention is not limited to the arrangements depicted in FIGS. 2, 9, and 10. Thus, as an example, referring to FIG. 2, the ensemble of conduits that is received atop base member 20 may, of course, be likewise received atop transversal member 150. Under the preferred embodiment of the present invention, transversal member contemplated will receive any nominally-sized conduit or pipe known in the art. Similarly, the base member contemplated by the preferred embodiment of the present invention will receive any nominal conduit system up to a 1¼ inch size.

It will be appreciated by those skilled in the art that embodiments of the present invention will avoid deterioration problems associated with the use of wood blocks as rooftop conduit supports, and will simultaneously inherently avoid or minimize the maintenance associated with use of such conduit supports. Thus, instead of having to change-out wood blocks over a 3–5 year time horizon—with frequent concomitant damage to rooftop surfaces—the present invention enables conduit supports to be permanently installed. In addition, it has been found that the present invention enables conduit to be affixed or flashed to rooftops in a diversity of dispositions. While the majority of conduit is affixed substantially upon a rooftop, having the capability to affix conduit supports vertically or obliquely as a function of the structures confronting a particular installation, affords significant convenience, economy, and longevity. It will be appreciated that these several advantages of the present invention apply to conduit required by electrical, plumbing, and gas installations alike.

Other variations and modifications will, of course, become apparent from a consideration of the structures and techniques hereinbefore described and depicted. Accordingly, it should be dearly understood that the present invention is not intended to be limited by the particular features and structures hereinbefore described and depicted in the accompanying drawings, but that the present invention is to be measured by the scope of the appended claims herein.

What is claimed is:

1. For a building having a substantially flat rooftop surface, a conduit support assembly comprising:

a base member having a top surface, a bottom surface, and a longitudinal axis, and configured to be fixedly attached to said rooftop surface;

said base member configured with a first coupler member at one longitudinal edge thereof and a second coupler member at the other longitudinal edge thereof, for coupling said conduit support assembly longitudinally with another conduit support assembly;

a bridge assembly disposed above said base member along said longitudinal axis thereof, and having:

a first brace member at one end affixed to said top surface of said base member with a first pair of leg means, a second brace member at the other opposite end affixed to said top surface of said base member with a second pair of leg means, and a transversal member disposed parallel to and above said base member and fixedly attached at each opposite end to each of said first brace member and said second brace member;

said bridge assembly configured to receive:

a first plurality of conduit means disposed horizontally atop said transversal member with each conduit of said first plurality of conduit means disposed upon said transversal member in a spaced-apart relationship, and a second plurality of conduit means disposed horizontally atop said base member in a space medial of said base member means and said transversal member with each conduit of said second plurality of conduit means disposed upon said transversal member in a spaced-apart relationship;

each of said first plurality of conduit means and said second plurality of conduit means secured to said conduit support assembly with a corresponding plurality of clamp means.

2. The conduit support assembly recited in claim 1, wherein said first coupler member is configured to be abuttably received by said second coupler member of said other conduit support assembly, and said second coupler member is configured to be abuttably received by said first coupler member of said other conduit support assembly.

3. For a building having a substantially flat rooftop surface, a conduit support assembly comprising:

a base member having a top surface, a bottom surface and a longitudinal axis, and configured to be fixedly attached to said rooftop surface;

said base member configured with a first coupler member at one longitudinal edge thereof and a second coupler member at the other longitudinal edge thereof, for coupling said conduit support assembly longitudinally with another conduit support assembly;

a bridge assembly disposed above said base member along said longitudinal axis thereof, and having:

a first brace member at one end affixed to said top surface of said base member with a first pair of leg means, a second brace member at the other opposite end affixed to said top surface of said base member with a second pair of leg means, and a transversal member disposed parallel to and above said base member and fixedly attached at each opposite end to each of said first brace member and said second brace member;

said bridge assembly configured to receive:

a first plurality of conduit means disposed horizontally atop said transversal member with each conduit of said first plurality of conduit means disposed upon said transversal member in a spaced-apart relationship, and a second plurality of conduit means disposed horizontally atop said base member in a space medial of said base member means and said transversal member with each conduit of said second plurality of conduit means disposed upon said transversal member in a spaced-apart relationship;

each of said first plurality of conduit means and said second plurality of conduit means secured to said conduit support assembly with a corresponding plurality of clamp means.

4. The conduit support assembly recited in claim 3, wherein said first plurality of conduit means disposed atop said transversal member is received perpendicularly of said longitudinal axis of said base member.

5. The conduit support assembly recited in claim 3, wherein one of said first plurality of conduit means disposed atop said transversal member is received parallel to said longitudinal axis of said base member.

6. The conduit support assembly recited in claim 3, wherein said second plurality of conduit means disposed atop said base member is received perpendicularly of said longitudinal axis of said base member.

7. The conduit support assembly recited in claim 3, wherein one of said second plurality of conduit means disposed atop said base member is received parallel to said longitudinal axis of said base member.

8. The conduit support assembly recited in claim 3, wherein said first brace member comprises a convex opening disposed between each leg of said first pair of leg means, configured to receive a conduit of said second plurality of conduit means.

9. The conduit support assembly recited in claim 8, wherein said second brace member comprises a convex opening disposed between each leg of said second pair of leg means, configured to receive a conduit of said second plurality of conduit means.

10. The conduit support assembly recited in claim 9, wherein said convex opening of said first brace member and said convex opening of said second brace member are configured to be symmetrical of said longitudinal axis of said base member, so that a conduit means of said second plurality of conduit means is received through said convex opening of said first brace member at one end of said conduit support assembly and through said convex opening of said second brace member at the opposite end of said conduit support assembly.

11. The conduit support assembly recited in claim 10, wherein said first brace member comprises an arcuate member disposed oppositely of said convex opening thereof and atop said first brace member medially of each leg of said first pair of leg means, configured to receive a conduit of said first plurality of conduit means.

12. The conduit support assembly recited in claim 11, wherein said second brace member comprises an arcuate member disposed oppositely of said convex opening thereof and atop said second brace member medially of each leg of said second pair of leg means, configured to receive a conduit of said first plurality of conduit means.

13. The conduit support assembly recited in claim 12, wherein said arcuate member of said first brace member and said arcuate member of said second brace member are configured to be symmetrical of said longitudinal axis of said base member, so that a conduit means of said first plurality of conduit means is received through said arcuate member of said first brace member at one end of said conduit support assembly and through said arcuate member of said second brace member at the opposite end of said conduit support assembly.

14. The conduit support assembly recited in claim 3, wherein said base member comprises a ribbed covering fixedly attached thereto for promoting firmly securing said first plurality of conduit means thereon.

15. The conduit support assembly recited in claim 3, wherein said transversal member composes a ribbed covering fixedly attached thereto for promoting firmly securing said second plurality of conduit means thereon.

16. The conduit support assembly recited in claim 3, wherein said base member comprises a dimpled bottom for enhancing the strength thereof.

17. The conduit support assembly recited in claim 3, wherein said first coupler member is configured to be abuttably received by said second coupler member of said other conduit support assembly, and said second coupler member is configured to be abuttably received by said first coupler member of said other conduit support assembly.

18. The conduit support assembly recited in claim 3, wherein said arcuate member of said first brace member and said arcuate member of said second brace member are configured to be stacked atop like members of another conduit support assembly.

\* \* \* \* \*